United States Patent [19]

Tipps

[11] Patent Number: 5,615,795
[45] Date of Patent: Apr. 1, 1997

[54] HAZARDOUS MATERIALS CONTAINER

[76] Inventor: Steven V. Tipps, P.O. Box 820369, Dallas, Tex. 75382

[21] Appl. No.: 367,955

[22] Filed: Jan. 3, 1995

[51] Int. Cl.⁶ .................. B65D 5/56; B65D 5/60
[52] U.S. Cl. .............. 220/410; 206/523; 206/589; 206/594; 220/403
[58] Field of Search ................. 229/3.1, 3.5 R; 206/523, 589, 591, 592, 594; 220/403, 408, 410, 416, 418, 417, 461, 462, 902

[56] References Cited

U.S. PATENT DOCUMENTS

| | | | |
|---|---|---|---|
| 2,006,705 | 7/1935 | Bangs | 220/410 |
| 2,352,503 | 6/1944 | Walton. | |
| 2,724,494 | 11/1955 | Graff | 220/408 |
| 2,807,402 | 9/1957 | Nelbach | 220/418 |
| 3,029,008 | 4/1962 | Membrino | 220/468 |
| 3,257,063 | 6/1966 | Oliver | 220/468 |
| 3,344,973 | 10/1967 | Studen | 206/523 |
| 3,445,051 | 5/1969 | Goldman | 220/468 |
| 3,576,290 | 4/1971 | Marchisen. | |
| 3,865,301 | 2/1975 | Pothier et al. | 220/418 |
| 3,908,888 | 9/1975 | Gordon | 229/3.1 |
| 3,910,482 | 10/1975 | Bamburg et al. | 220/418 |
| 4,534,489 | 8/1985 | Bartlett. | |
| 4,560,069 | 12/1985 | Simon | 220/408 |
| 4,638,912 | 1/1987 | Graf. | |
| 4,640,418 | 2/1987 | Lowry | 206/523 |
| 4,674,676 | 6/1987 | Sandel et al.. | |
| 4,682,708 | 7/1987 | Pool | 220/468 |
| 4,715,511 | 12/1987 | Bohlen. | |
| 4,863,052 | 9/1989 | Lambert. | |
| 4,872,588 | 10/1989 | Texidor. | |
| 4,889,252 | 12/1989 | Rockom et al. | 220/418 |
| 4,905,898 | 3/1990 | Wade. | |
| 4,953,705 | 9/1990 | Evamy | 206/523 |
| 5,009,326 | 4/1991 | Reaves et al. | 220/410 |
| 5,040,678 | 8/1991 | Lenmark, Sr. et al. | 206/523 |
| 5,040,696 | 8/1991 | Liebel | 220/418 |
| 5,050,775 | 9/1991 | Marquardt. | |
| 5,062,527 | 11/1991 | Westerman | 229/117 |
| 5,096,114 | 3/1992 | Higginbotham. | |
| 5,111,957 | 5/1992 | Hollander et al. | 220/410 |
| 5,160,025 | 11/1992 | Greenawald | 206/386 |
| 5,201,868 | 4/1993 | Johnson | 220/403 |
| 5,356,006 | 10/1994 | Alpern et al. | 206/523 |
| 5,356,022 | 10/1994 | Tipps. | |
| 5,417,342 | 5/1995 | Hutchison | 220/410 |
| 5,429,264 | 7/1995 | Hollander et al. | 220/410 |
| 5,441,170 | 8/1995 | Bane, III | 220/410 |
| 5,450,948 | 9/1995 | Beausoleil et al. | 206/523 |

FOREIGN PATENT DOCUMENTS

| | | | |
|---|---|---|---|
| 2416850 | 10/1979 | France | 220/462 |
| 2660623 | 10/1991 | France. | |
| 4108254 | 9/1992 | Germany. | |

OTHER PUBLICATIONS

Correspondence to Steven Tipps from S. C. Brooks, dated Oct. 31, 1994.

Certification Report #0818, CTL P. #34878 dated Oct. 31, 1994.

*Primary Examiner*—Gary E. Elkins
*Attorney, Agent, or Firm*—Gunn & Associates

[57] ABSTRACT

A hazardous materials container provides an enclosure for the transshipment of biological and other materials. The enclosure provides a portable, disposable, and/or reusable container. A first outside layer is constructed of a corrugated fiberboard. An inside lamination of reinforcing material, such as polyethylene terephthalate provides mechanical robustness to the container that meets new regulations for impact on such a container during shipment. Sections of reinforcing materials are recessed from the edges of the fiberboard. When assembled, the die-cut and bonded reinforcing materials provide a transportation container system suitable for shipping infections substances and other hazardous materials. The reinforcing materials permit fabrication of containers which protect the inner primary receptacles which are used to contain the transported materials.

11 Claims, 4 Drawing Sheets

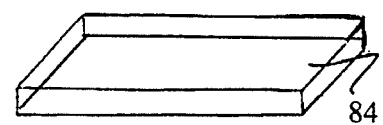
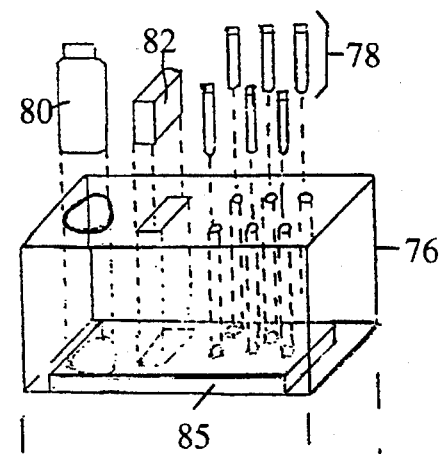
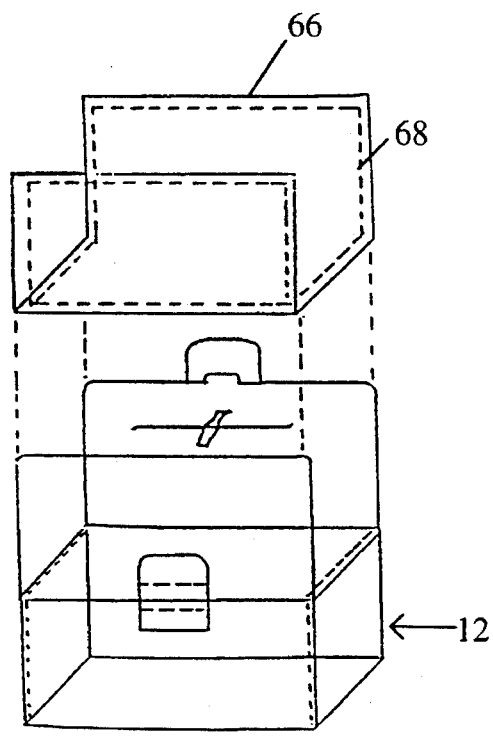
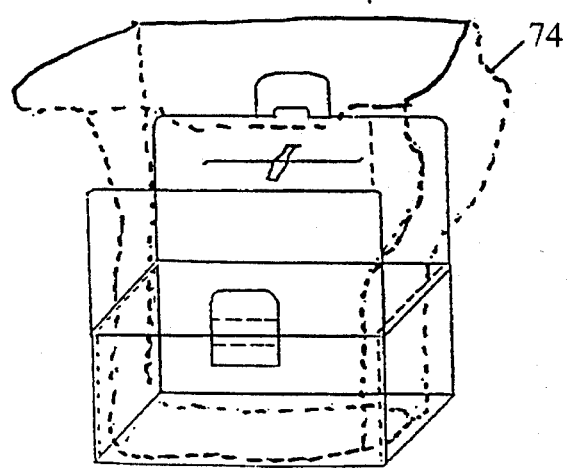

HAZARDOUS MATERIALS CONTAINER

FIELD OF THE INVENTION

The present invention relates generally to the field of shipping containers and, more particularly, to a reinforced container that provides an enclosure for the transshipment of hazardous materials, the container also providing a mechanically robust enclosure that resists damage due to impact during transport.

BACKGROUND OF THE INVENTION

Historically, the corrugated box industry has supplied the health care industry with containers for the shipment of hazardous or potentially contaminated materials. Such potentially contaminated materials include such materials as blood and blood products, as well as urine, sputum, body organs, and others. Unfortunately, due to the large volume in this industry and intense price competition, the corrugated box industry has been driven in large part by the need for high speed production and lowering costs.

Because of these pressures on the industry, designs of containers for such materials have been oriented usually toward a single ply corrugated arrangement. For applications requiring greater load bearing capability, primarily in industrial application, a double or triple wall corrugated design was generally accepted as the solution. The multi-wall corrugated design has the advantage of using much the same manufacturing machinery as the single wall design, or may be made in a conversion facility.

In addition to the outer corrugated box container, routine shipping practice includes placing the hazardous material within a primary or inner container. For example, a primary container may comprise a pressure tested screw-top bottle of acceptable construction and durability. Other primary/secondary container combinations are also commonly used, including but not limited to styrofoam. Such primary containers, for example used for whole blood, also include vacutainer rubber stoppered glass or plastic vials.

The standards for packaging performance for the transportation of infectious substances and hazardous materials are established by the United Nations Transport of Dangerous Goods, Chapter 9, as interpreted by the International Maritime Organization ("IMO"), under the Internationals Maritime Dangerous Goods code ("IMDG"), the International Civil Aeronautics Organization ("ICAO"), as interpreted by the International Air Transport Association ("IATA"), the U.S. Department of Transportation ("DOT"), the U.S. Department of Labor's enforcement arm, the Occupational Safety and Hazard Administration ("OSHA"), the U.S. Centers for Disease Control ("CDC"), and other regulatory departments and agencies, domestic and international.

These regulations and guidelines have elevated the requirements to protect the environment and personnel from exposure to the contents of shipping containers, especially materials such as etiologic agents, anti-neoplastic chemicals, acids, caustics, radioactive materials, and related chemicals and product waste streams. The standards generally permit penetration of outer containers by the so-called "Rod Test" and penetration of the primary container or containers by the Rod, provided there is no leakage from the primary container after the tests.

The package performance testing standards for the shipment of infectious substances are specified in the International Air Transport Association Packaging Specifications and Performance Tests, Section 10.5.1 et seq. These tests include, but are not limited to, freezing the first in a series of sample packages to a minimum of 18° C. for up to 24 hours. The first sample package is subjected to the Rod Test. The Rod Test includes a free-fall drop of a 7 kg (15.5 pound), 1.5" diameter steel rod with a 0.2" point onto the top, sides, and bottom of the package from a height of one meter. The Rod Test also includes releasing the pre-packed frozen package in free-fall onto a vertically mounted extended steel spike from a height of one meter.

Performance standards further include a Drop Test. The Drop Test includes freezing a second sample package and subjecting it to a water spray for a, specified duration, then releasing this second sample from approximately nine meters. The present invention has proven to withstand both the Rod Test and the Drop Test.

The container that is the subject of the present invention finds application in clinical laboratories, biological research institutions, and health care organizations that transport specimens from patients and laboratory animals to other laboratory and research locations for diagnostic and scientific evaluation. Laboratory personnel and health care professionals routinely draw blood and other biological specimens into vacuum tubes for scientific and clinical analytical procedures. A substantial volume of such specimens is transported to remote laboratory sites each day, aboard surface transportation and commercial aircraft. The specimens are then handled at each stage of transport by personnel involved in the health care organizations, clinical and research laboratories, surface transportation, commercial aircraft, and airport facilities.

For both convenience and cost, known packaging methods have addressed an environment characterized by relatively low risk to personnel. Hazards presented by the resurgence of infectious diseases, as well as the advent of the AIDS epidemic, justify the packaging which protects personnel and provides a convenient and low cost means of compliance with the standards promulgated by the organizations listed above. Personnel would benefit from the convenience of low cost packaging which is certified for the intended purpose of shipping infectious substances and hazardous materials.

Thus, their remains a need for a high-strength container for the transshipment of hazardous materials. Such a container must protect a primary (inner) container from penetrating impact. The container must also protect the material within the inner container from contamination from materials outside the shipping package. The container must also be adaptable to a variety of sizes and geometries, thus avoiding substantial tooling costs and manufacturing leadtime associated with complex manufacturing techniques, such as injection molding. Also, the container must be adaptable to receive a variety of sizes and configurations of samples and sample containers.

SUMMARY OF THE INVENTION

The present invention solves these and other drawbacks and needs of the prior art by providing a reinforced outer container for the shipment of hazardous materials. The outer secondary container meets all current and proposed standards for resistance to penetration due to impact, thereby permitting the utilization of removable and disposable containers within the outer container.

The present invention comprises a fiberboard outer container which may be die cut by conventional methods and an inner lining of low density, high tensile strength reinforcing material, such as polyethylene terephthalate. The outer container and the reinforcing lining are bonded together to make a light, strong package. The particular reinforcing material is chosen to maintain its strength in low temperatures that may be experienced in high altitude flight.

This combination reduces the direct cost of transporting hazardous materials by significantly reducing shipping weight. This also permits the use of readily available primary containers and still meet stringent standards for the transshipment of hazardous materials.

These and other features and advantages of the present invention will be immediately apparent to those of skill in the art by reviewing the following detailed description along with the accompanying drawings.

BRIEF DESCRIPTION OF THE DRAWINGS

FIG. 5 depicts the insertion of additional reinforcing materials into the container of the present invention.

FIG. 6 illustrates the adaptation of the present invention to receive a primary container holding hazardous materials.

DETAILED DESCRIPTION OF A PREFERRED EMBODIMENT

Figure 1:
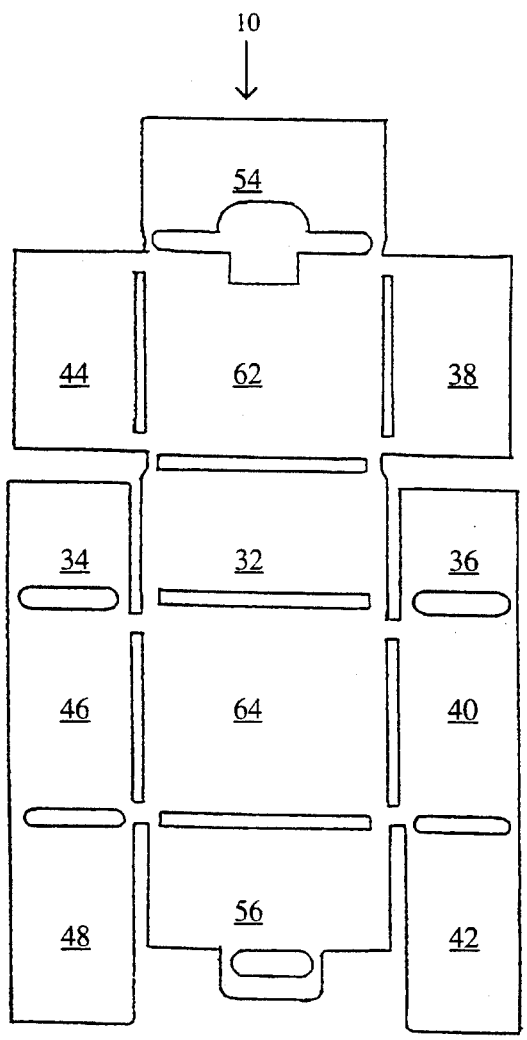
FIG. 1 is a plan view of the inner, reinforcing lining that is aligned with the scores of the outer container of FIG. 2.
Figure 2:
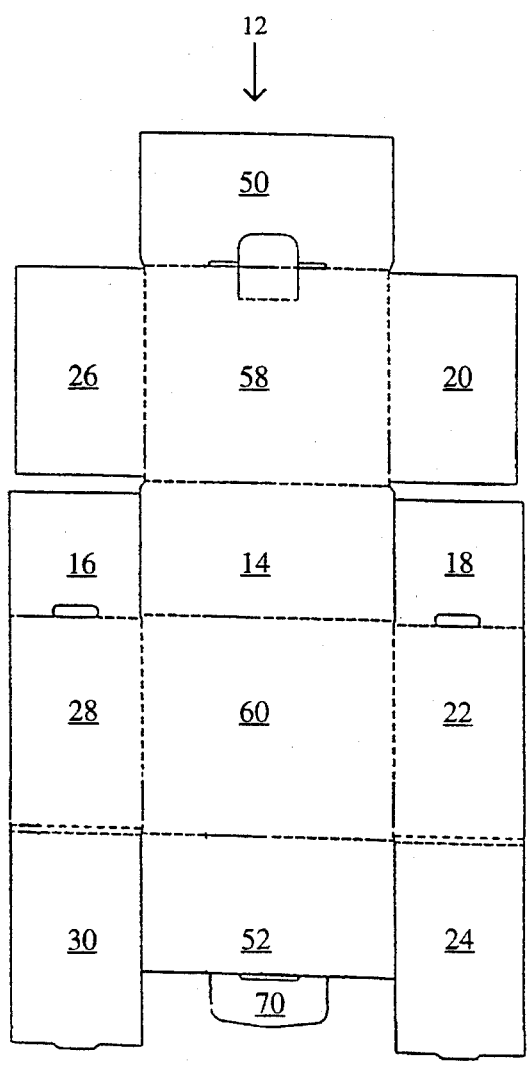
FIG. 2 is a plan view of an outer container of the present invention.

Referring now to FIGS. 1 and 2, a preferred embodiment of the present invention is depicted. FIG. 1 shows a plan view of a reinforcing lining 10, such as polyethylene terephthalate, sold commercially as MYLAR. FIG. 2 shows a plan view of a fiberboard outer body 12, which may be die cut and scored by convention means. When folded and assembled, the preferred embodiment will include at least a double thickness of the lining 10 and the fiberboard outer body 12 on each wall of the container.

The body 12 of FIG. 2 includes a plurality of score lines, depicted as dashed lines in the figure. The body includes a first bottom panel 14 and second bottom panels 16 and 18. It also includes a first right side wall 20, a second right side wall 22, a third right side wall 24, and corresponding first, second, and third left side walls 26, 28, and 30, respectively.

Similarly, the lining 10 of FIG. 1 includes panels 32, 34, 36, 38, 40, 42, 44, 46, and 48, corresponding to the body panels. However, the edges of the lining panels are recessed from the edges of the body panels. In other words, each corresponding lining panel is slightly smaller than its associated body panel. This makes for a clean assembly when the container is folded thereby eliminating wrinkles in the lining panels.

The body 12 further includes a first top panel 50 and a second top panel 52. The lining similarly includes corresponding panels 54 and 56. Those of skill in the art will appreciate that the only panels of the structure of FIGS. 1 and 2 that are not at least doubled are a rear panel 58 and a front panel 60, with corresponding lining panels 62 and 64. This is taken care of by a panel insert 66 and corresponding lining panel 68, shown in FIG. 5.

The body 12 may also include a closure tab 70 that slides into an opening 72 in a manner known in the art.

Figure 3:
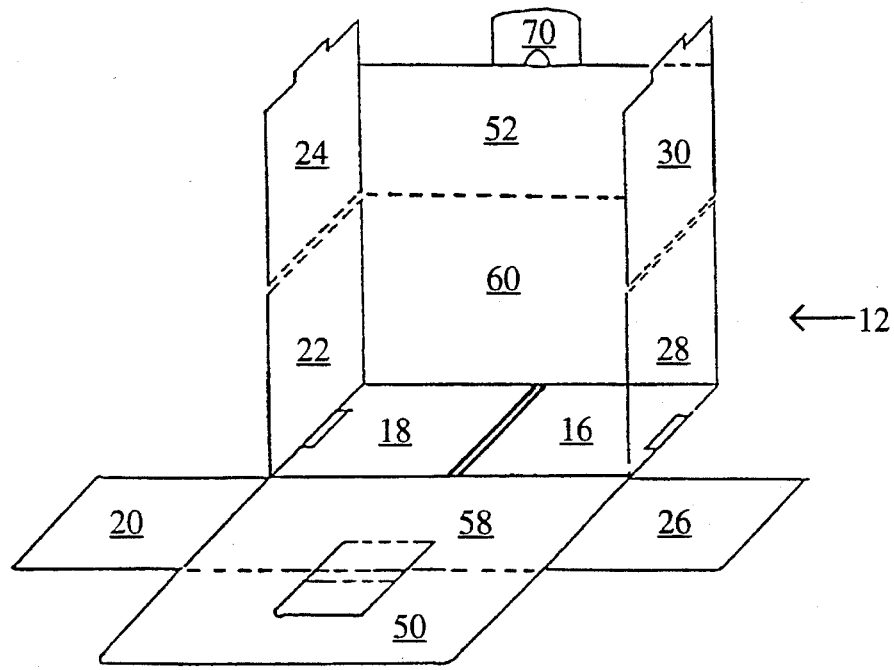
FIG. 3 depicts a first stage of the folding process of assembly the shipping container of the present invention.
Figure 4:
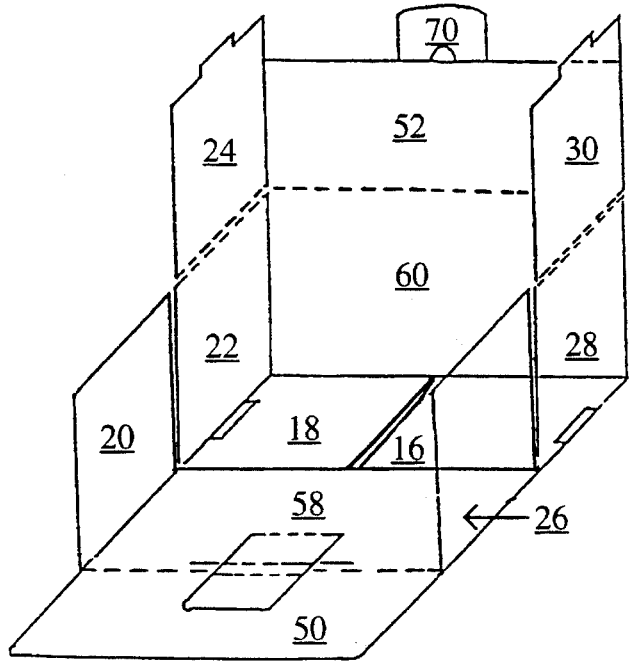
FIG. 4 depicts a second stage of the folding process.

FIGS. 3 and 4 depict two steps in the folding and assembly process of the container of the present invention. Note that the lining 10 has already been bonded to the body 12, preferably by gluing, although any appropriate bonding technique may be used. Note also that the body 12 depicted in FIGS. 3 and 4 is reversed from that of FIG. 2 for ease of illustration.

In FIG. 3, the bottom panels 16 and 18 have been folded in, obscuring the bottom panel 14. The side panels 20 and 26 are still lying flat, as in the plan view. However, the side panels 20 and 26 are folded up in FIG. 4, so that they may slide inside panels 22 and 28, respectively.

Referring now to FIG. 5, the body 12 is now assembled to the point of accepting the insert 66. The insert 66 provides an additional layer of fiberboard and reinforcing lining to the front and rear panels. As shown in FIG. 6, once the insert 66 is in place, the container may receive an overwrap 74, like that provided by Federal Express for this purpose. The overwrap 74 serves as a diagnostic specimen envelope. Inserted within the overwrap 74 is a foam insert 76, which is preferably cut to receive specific primary containers. For example, but not by way of limitation, the foam insert of FIG. 6 is configured to receive a plurality of specimen vials 78, as well as a sample bottle 80. The foam insert may also be configured to receive other sample containers or slides. The sample bottle itself should qualify, including IATA hydrostatic pressure test, as a receptacle for blood vials, urine sample containers, sputum containers, glass slides, and the like.

If a sample bottle 80 serves as a primary container holding another container, such as a blood sample tube, a super absorbent paper pouch should be included inside the bottle but outside the blood sample tube. If the sample bottle 80 serves as a primary container directly holding a fluid or other sample, the absorbent paper pouch should be inserted between the bottle and the overwrap 74 before it is sealed. The absorbent permits the absorption of moisture and condensation, thus eliminating the buildup of moisture on the outside of the container unit, a major reason for rejection of containers by air carriers and airline freight counters.

The insert 76 may also receive a foam refrigerant 82, such as a RE-FREEZ-R-BRIX from Polar Tech. Industries, Inc. in Elgin, Ill. 60123, although dry ice may also be used. Some applications may find encapsulated liquid nitrogen to be preferable. Finally, the samples are covered with a foam top 84 to provide impact protection from this direction, as well.

The insert 76 may also includes a bottom voided area 85 to contain an additional volume of a coolant or refrigerant, such as dry ice. The insulation properties of the foam block insert 76 have proven to be excellent. Dry ice drops the temperature within the container to $-109°$ C. and freezes the samples within the container. If slab ice is sawed to size and fitted into the insert, the thermal performance is maintained for more than 36 hours. If dry ice in pellet form is used, freezing conditions are maintained for more than 24 hours.

For biological specimens that must be maintained at room temperature, the coolant is left out and the container of the present invention provides insulation from outside cold, such as for example in a cargo hold of an aircraft or outside ambient cold.

Figure 7:
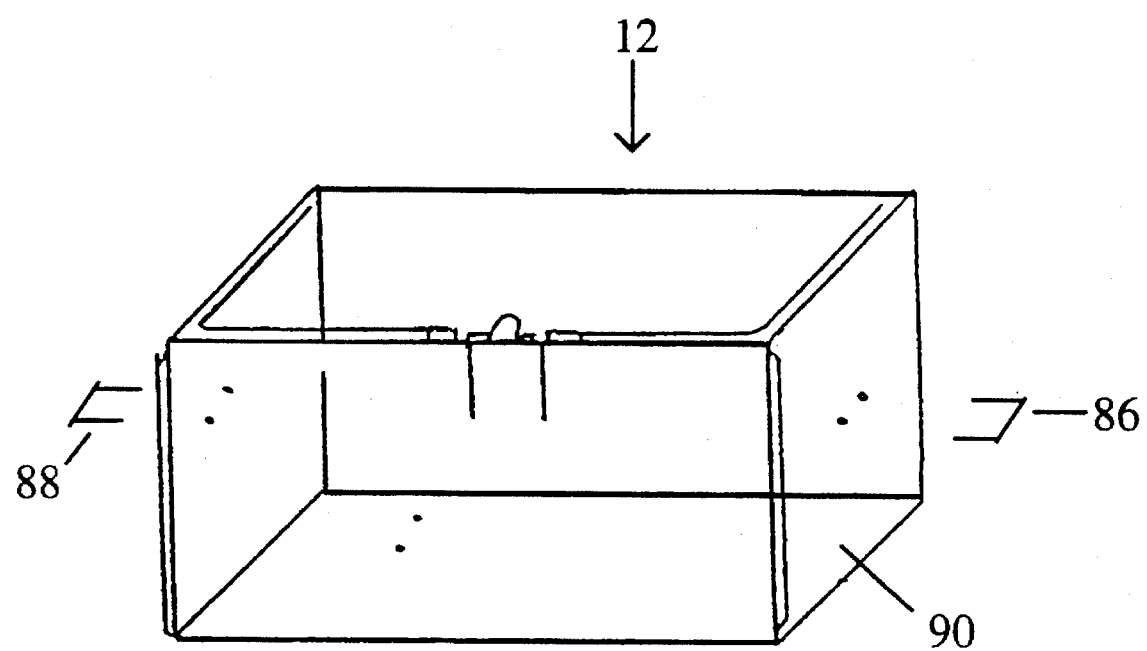
FIG. 7 shows the final assembled container.

FIG. 7 depicts the container in its final, assembled condition. The container forms a carton with a reinforcing lining bonded to the interior surface of the carton. The container may also be secured with a set of steel staples 86 and 88, if desired. If the container is constructed in accordance with the present invention, the inclusion of the staples provides additional sturdiness to the container in the Rod Test and the Drop Test.

The preferred embodiment of the present invention includes a lining 10 of opaque MYLAR that is 10 mils thick and industrial grade. When laminated to corrugated fiberboard, the lamination equals or exceeds the tensile strength of the MYLAR, or about 72,000 pounds per square inch in single layers. This is equivalent to the tensile strength of aluminum. Opaque MYLAR is preferred to block out the image of the corrugated flutes, enhancing the appearance of durability and strength.

In the preferred manufacturing process, MYLAR sheets are laminated to a double-coated adhesive backing and die-cut as stacks of sheets positioned over a flat-bed die in a press, such as for example, a 70 ton vertical hydraulic press. A separate die is used for the MYLAR sheet. Its overall area is reduced slightly to provide a recessed edge, away from the outside edge of the fiberboard, as previously described, to prevent the sharp edge from coming into contact during the filling and handling stage of preparing a package.

The adhesive backing of a sheet of MYLAR is peeled off and placed in a template. The die-cut, printed and scored corrugated sheet is then top loaded from one end, scores pointing downward, and dropped over the exposed adhesive surface. The fiberboard thus covers the entire surface of the MYLAR and applied adhesive. The adhesive may also be applied by air sprayers or using a wide capacity pot-devin for direct roller application onto the MYLAR, as though it were a large label.

The lamination is then folded to form a box, as previously described, which is minus a box manufacturer's glue joint. This type of box is generally referred to in the art as a fold-and-tuck design. As the box is folded, the side walls are folded up and generally comprise a plurality of corrugated fiberboard and MYLAR lamination.

When the box in completed, the top comprises two panels, each coated with ten mils of MYLAR. The bottom comprises one full panel and an overlay of two half panels. The side panels are preferably stapled together with at least one and preferably two steel staples. This steel staple penetrates and curls back through the panels, with its two sharp endpoints pointing toward the interior of the container, as shown in FIG. 7. The staples also serve to prevent slippage of the MYLAR across the surface of the fiberboard.

Finally, the outer corrugated box may be lined with an outer reinforcing lining 90. This outer lining 90 may comprise a cross laminated plastic, such as VALERON, made by Van Leer, or its equivalent. This outer lining 90 provides the additional advantage of making the entire package into a reusable container product with even greater thermal protection for the contents of the container.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A container comprising:
    a. a carton shaped generally as a parallelepiped having opposing left and right side panels, opposing front and rear panels, a top panel, and a bottom panel, all of the panels defining an interior of the carton;
    b. wherein each of the left, right, top, and bottom panels are formed of at least a double thickness of a corrugated material and further wherein the left and right side panels, opposing front and rear panels, top panel, and bottom panel are formed from a single piece of corrugated material;
    c. a strength-reinforcing layer bonded to the interior;
    d. an insert laminated with a strength-reinforcing layer, shaped to conform to the bottom and the front and rear panels;
    e. a foam block configured to conform to the insert; and
    f. a foam top configured to fit between the foam block and the top panel.

2. The container of claim 1 wherein the reinforcing layer is formed of polyethylene terephthalate.

3. The container of claim 1 wherein the reinforcing layer is formed of a plurality of plies of material.

4. The container of claim 1, wherein the carton is made from a first flat sheet material defining a first perimeter outline of a first dimension and the reinforcing layer is made from a second flat sheet material defining a second perimeter outline that is smaller than the first perimeter outline.

5. The container of claim 1 further comprising slots within the foam block.

6. The container of claim 5 wherein at least one of the slots is configured to receive a refrigerant.

7. The container of claim 5 wherein at least one of the slots is configured to receive a primary container for a specimen.

8. The container of claim 5 wherein at least one of the slots is configured to receive a blood sample vial.

9. The container of claim 1 further comprising a plastic overwrap between the carton and the foam block.

10. The container of claim 1 wherein the carton is formed of fiberboard.

11. The container of claim 1, wherein the sides, top, and bottom define an exterior and further comprising a cross laminated plastic lining on the exterior of the container.

* * * * *